United States Patent [19]

Markley

[11] 4,035,043
[45] July 12, 1977

[54] SIDE RACE BALL BEARING

[76] Inventor: Christian D. Markley, P.O. Box 384, Key West, Fla. 33040

[21] Appl. No.: 671,616

[22] Filed: Apr. 8, 1976

[51] Int. Cl.² ........................................ F16C 19/18
[52] U.S. Cl. ................................. 308/174; 308/188
[58] Field of Search .......... 308/174, 190, 193, 201, 308/188

[56] References Cited

U.S. PATENT DOCUMENTS

| | | | |
|---|---|---|---|
| 2,635,018 | 4/1953 | Palumbo | 308/174 |
| 2,690,935 | 10/1954 | Alexander | 308/174 X |
| 2,733,967 | 2/1956 | Jones | 308/174 |
| 3,913,993 | 10/1975 | Ernst | 308/201 X |

Primary Examiner—Joseph F. Peters, Jr.
Assistant Examiner—Gene A. Church

[57] ABSTRACT

This double row ball bearing has the bearing balls confined axially between confronting concave bearing surfaces on the outer and inner races. Each bearing surface has a compound arcuate curvature, with an outer arc extending laterally outward from the axial centerline of each bearing ball and having a minimum radius from the center of the ball which is offset radially outward from the latter's axial centerline, and with an inner arc intersecting the outer arc at the axial centerline of the ball and extending laterally inward therefrom and having a minimum radius from the center of the ball which is offset radially inward from the latter's axial centerline. Cages maintain the balls in each row spaced apart circumferentially.

19 Claims, 4 Drawing Figures

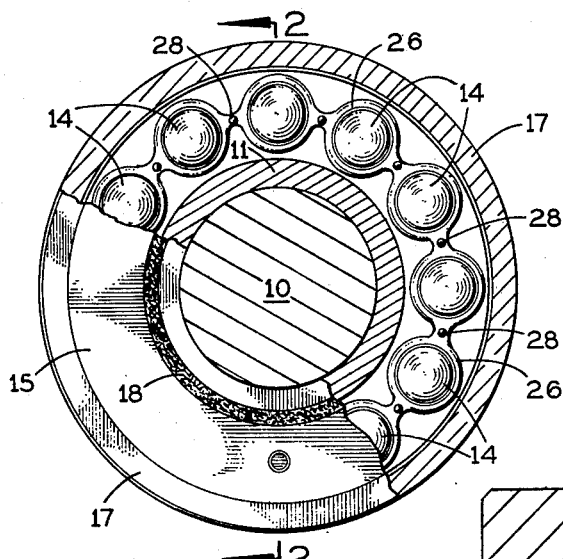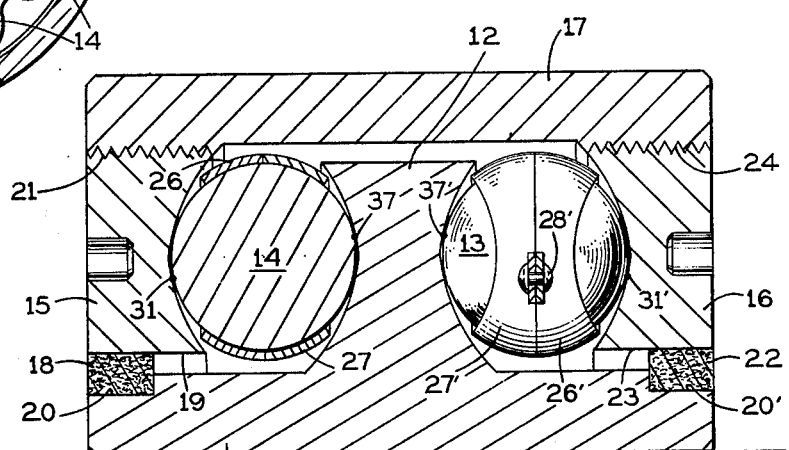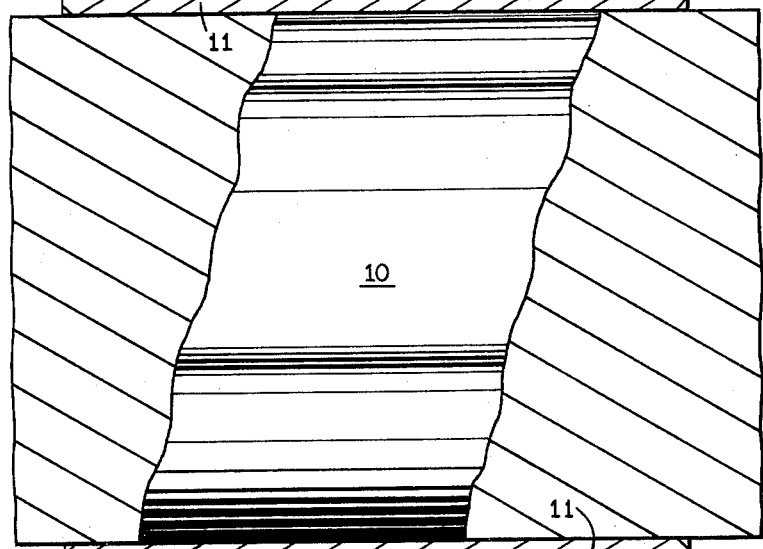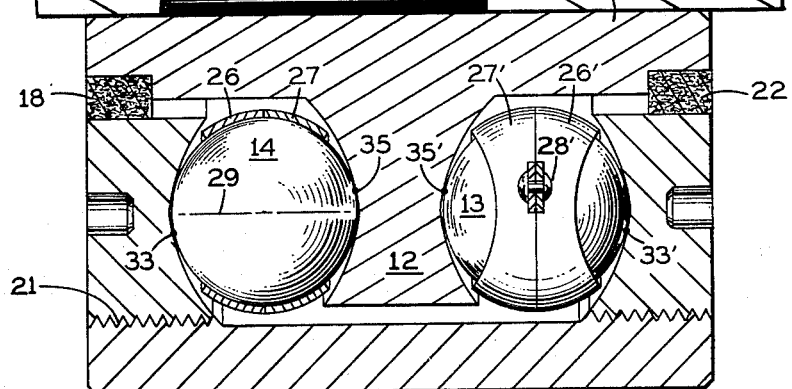
FIG. 1
FIG. 2

SIDE RACE BALL BEARING

BACKGROUND OF THE INVENTION

Various ball bearings, including two-row bearings, have been disclosed heretofore which are designed to take both radial and axial loads. Examples of such prior bearings are shown in the following U.S. Pat. Nos.: Vincon 1,543,135; McNeely 1,591,305; Cutland 2,111,153; Wittnofft 2,469,677; Palumbo 2,635,018; Jones 2,733,967; and Sellew Re. 15,233.

Among the disadvantages of such prior arrangements are the absence of a ball-retaining cage to maintain the bearing balls evenly spaced apart circumferentially and out of rubbing contact with each other, and the concentration of stress on the bearing balls nearest where the radial load is applied.

SUMMARY OF THE INVENTION

The present invention is a novel side race bearing which takes up both radial and axial loads in an advantageous manner. The bearing balls are rotatable in cages which hold them evenly spaced apart circumferentially. The outer and inner races present concave bearing surfaces of compound curvature having minimum radius points on opposite axial sides of the balls which are located on opposite sides (radially) of the axial centerline of each ball. The bearing may be pre-stressed and it is readily adjustable to compensate for wear.

A principal object of this invention is to provide a novel and improved ball bearing.

Another object of this invention is to provide such a bearing having novel engagement between the balls and the races which better distributes stresses caused by radial and axial loads and otherwise improves the operating characteristics of the bearing.

Further objects and advantages of this invention will be apparent from the following detailed description of a presently-preferred embodiment, shown in the accompanying drawings in which:

FIG. 1 is an end elevational view, with parts broken away for clarity, showing a preferred embodiment of the present ball bearing on a rotatable or fixed shaft (shown in cross-section);

FIG. 2 is an enlarged axial section taken along the line 2—2 in FIG. 1 and showing the preferred embodiment of the present bearing with two axially-spaced rows of circumferentially spaced bearing balls;

Figure 3:
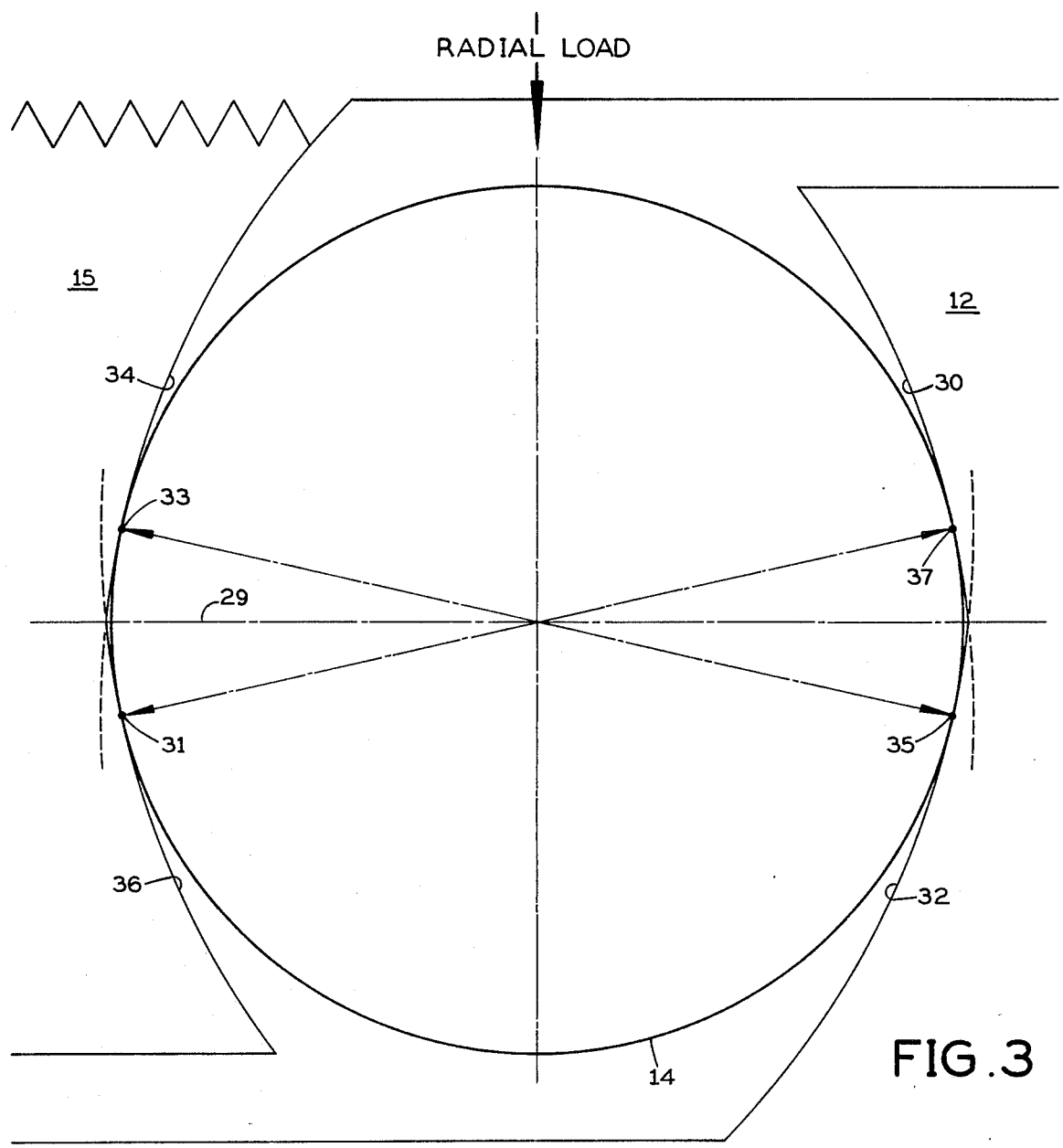
FIG. 3 is a greatly enlarged view showing the engagement of one of the bearing balls axially between the confronting concave bearing surfaces on the inner and outer races of the bearing.

Before explaining the disclosed embodiment of the present invention in detail, it is to be understood that the invention is not limited in its application to the details of the particular arrangement shown, since the invention is capable of other embodiments. Also, the terminology used herein is for the purpose of description and not of limitation.

Referring to FIG. 2, a rotatable or fixed shaft 10 is press-fitted or keyed to a rigid, annular, inner bearing race 11 having an annular flange or extension 12 which projects radially outward between two axially-spaced, circumferentially arranged rows of bearing balls 13 and 14. The projection 12 of the inner race presents opposite axially outwardly-facing bearing surfaces which engage the balls in each row at their respective axially inboard faces and which have a particular concave curvature to be explained in detail hereinafter.

The bearing also has a three-piece outer race which consists of:
1. an annular, externally screw-threaded first outer race member 15 which loosely surrounds the left end of the inner race 11, to the left of the left row of bearing balls 14 in FIG. 2;
2. an annular, externally screw-threaded second outer race member 16 which loosely surrounds the right end of the inner race 11, to the right of the right row of bearing balls 13; and
3. an annular, internally screw-threaded third outer race member 17 threadedly engaging and surrounding the first and second outer race members 15 and 16 and projecting axially between them around the outside of the two rows of bearing balls and the annular radial projection 12 of the inner race 11.

The first outer race member 15 has an axially inwardly-facing bearing surface which engages the balls 14 at their axially outboard faces and has a curvature that is a mirror image of the curvature of the adjacent, confronting bearing surface on the inner race projection 12 (which engages the balls 14 on the opposite side). An annular grease seal 18 of conventional design is engaged radially between the cylindrical inside peripheral surface 19 of the first outer race member 15 and the reduced, cylindrical, outside peripheral surface 20 of the inner race 11 to the left of the lefthand row of bearing balls 14. The outer periphery of the first outer race member 15 is in a screw-threaded engagement at 21 with the inside of the third outer race member 17 at the latter's left end in FIG. 2.

The second outer race member 16 has an axially inwardly-facing bearing surface which engages the balls 13 at their axially outboard faces and which has a curvature that is a mirror image of the curvature of the adjacent, confronting bearing surface on the inner race projection 12, (which engages the balls 13 on the opposite side). An annular grease seal 22 of conventional design is engaged radially between the cylindrical inside peripheral surface 23 of the second outer race member 13 and the reduced, cylindrical, outside peripheral surface 20' of the inner race member 11 to the right of the right-hand row of bearing balls 13.

The third outer race member 17 is internally screw-threaded at its right end and there it threadedly engages the outside of the second outer race member 16, as shown at 24 in FIG. 2. Between its screw-threaded portions at 21 and 24 the third outer race member 17 presents a cylindrical segment which projects circumferentially around the outside of the two rows of bearing balls 14 and 13 and across the outside of the annular radial projection 12 on the inner race 11.

Figure 4:
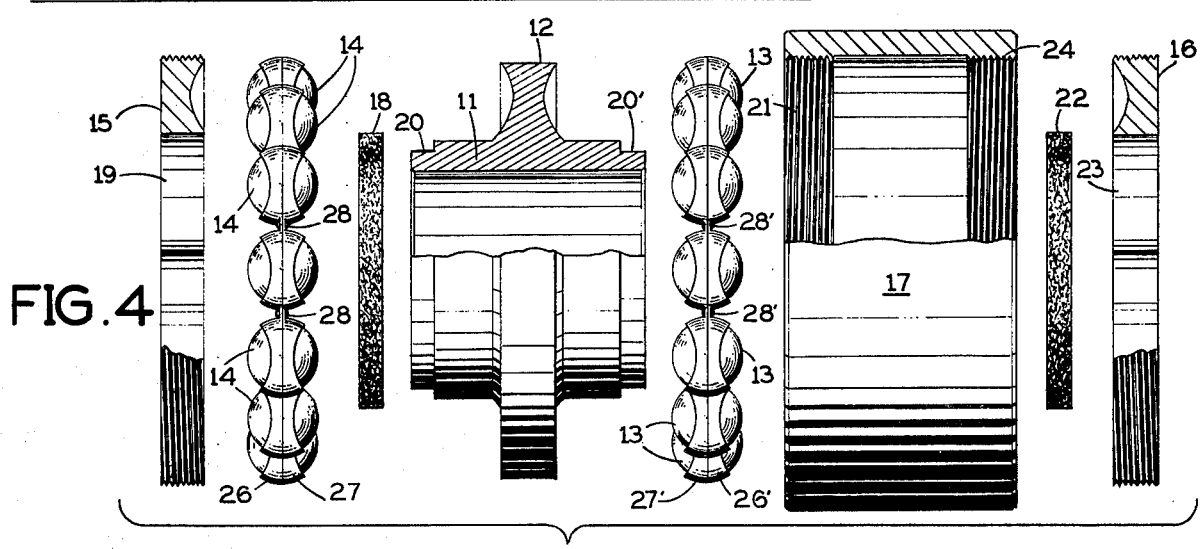
FIG. 4 is an exploded axial section of the complete bearing assembly with one part broken away for clarity.

Each row of bearing balls is provided with a cage, preferably of pressed sheet metal, for holding the balls in each row spaced apart circumferentially while permitting the individual balls to turn freely. As shown in FIGS. 1, 2 and 4, the cage for the left-hand row of balls 14 comprises two annular sheet metal pieces 26 and 27, which abut against each other axially and define between them a plurality of circumferentially spaced, spherical pockets in which the individual bearing balls are rotatably seated. These pockets have circular openings 26a and 27a at each axial end where the individual balls 14 are exposed for direct contact with the adjacent concave bearing surfaces on the outer and inner races. These pockets may be coated on the inside with "Teflon" or other suitable self-lubricating material to facilitate the rolling of the balls therein. The two halves of this cage are attached to each other by rivets 28 (FIG. 1) located between the successive ball-receiving pockets.

The cage for the right-hand row of balls 13 is of identical construction, corresponding parts of which are given the same reference numerals, with a "prime" suffix added, as those of the just-described cage for the left-hand row of balls 14.

FIG. 3 shows in enlarged detail the engagement of one of the bearing balls 14 with the adjacent concave surfaces of the projection 12 on the inner race 11 and the first outer race member 15. It is to be understood that the same engagement is provided between each of the balls 13 in the second row and the adjacent concave surfaces of the inner race projection 12 and the second outer race number 16.

Referring to FIG. 3, the ball 14 is spherical and has a predetermined diameter D. The adjacent concave bearing surface on the inner race projection 12 is of complex curvature consisting of (in axial section):

1. radially outward from the axial centerline 29 of ball 14, an arc 30 of a circle with a radius D (equal to the diameter of ball 14) and with its center located at a point 31 on the opposite (left) side of ball 14 slightly inward radially from the axial centerline 29, which arc terminates at the centerline 29; and
2. radially inward from the axial centerline 29 of ball 14, an arc 32 of a circle of radius D with its center located at a point 33 on the opposite side of ball 14 outward radially from the axial centerline 29 by the same distance that the center 31 is inward from this axial centerline, which arc terminates at the axial centerline 29 and intersects the outer arc 30 there.

Similarly, the concave bearing surface on the first outer race member 15 has a complex curvature consisting of (in axial section):

1. radially outward from the axial centerline 29 of ball 14, an arc 34 of a circle of radius D with its center located at point 35 on the opposite (right) side of the ball at a location radially inward from the axial centerline 29 by the same distance as point 31, which arc terminates at the axial centerline 29 at the left side of ball 14 in FIG. 3; and
2. radially inward from the axial centerline 29, an arc 36 of a circle of radius D with its center located at point 37 on the opposite side of the ball at the same distance radially outward from the axial centerline 29 as point 33, which arc terminates at the axial centerline 29 at the left side of ball 14 and intersects the arc 34 there.

With this arrangement, the ball 14 engages the concave bearing surfaces at points 33 and 37 radially outward a short distance beyond its axial centerline 29 and at points 31 and 35 radially inward an equal distance from its axial centerline 29.

Referring to FIG. 2, assume that the radial load on the bearing is directed upward (such as if the bearing is on a wheel axle). Such thrust will be applied through the first outer race member 15 to the lowermost balls 14 in the left hand row at the minimum radius point 33, which is at the left side of these balls and below the axial centerline 29 of each ball. This upward, off-center thrust on the lower ball 14 tends to move it slightly upward in FIG. 2, wedging its opposite side against the inner race close to the diagonally opposite minimum radius point 35, which is on the right side of the ball and above its axial centerline. Therefore, as to this ball, the radial load is taken up equally near points 33 and 35 on the outer and inner races, respectively.

At the uppermost balls 14 in the left hand row, the upward radial thrust causes the load to be concentrated at the minimum radius point 31 on the outer race, which is below the ball's axial centerline and at the left side of the ball, and on the inner race close to the diagonally opposite minimum radius point 37, which is at the right side of the ball and above its axial centerline.

At the right-hand row of bearing balls, the upwardly directed thrust is applied by the second outer race member 16 to the lowermost balls 13 at the minimum radius point 33', which is located at the right side of the ball and below the axial centerline of the ball. This causes the ball to move slightly upward in FIG. 2, wedging its opposite side against the inner race close to the diagonally opposite minimum radius point 35', which is on the left side of the ball and above its axial centerline.

Also, at the uppermost balls 13 in the right hand row, the upward radial thrust causes the load to be concentrated at the minimum radius point 31' on the outer race, which is at the right side of the ball and below the axial centerline of the ball, and on the inner race close to the diagonally opposite minimum radius point 37', which is above the axial centerline of the ball and on the left side of the ball.

Thus, a radial load on the bearing causes both rows of balls to be forced axially inward (in opposite axial directions) against the adjacent bearing surfaces on the radial flange 12 of the inner race. The radial load is substantially evenly divided between the balls at the side of the bearing where the force is applied and the balls at the opposite side (rather than being concentrated only on the balls at the side where the force is applied). This distribution of the radial loading also reduces the friction between the balls and their cages. The wedging of the balls against the minimum radius points on the outer and inner races, as described, tends to equalize the wear because of the equal circumferences of the respective lines of engagement between each row of balls and the inner and outer races.

Axial loading on the bearing in either direction is taken up substantially equally at the four minimum radius points 31, 33, 35, 37 (or 31', 33', 35', 37') engaged by each ball.

The bearing may be pre-stressed to the desired extent, and wear may be compensated for, by adjusting either or both of the first and second outer race members 15 and 16 axially along the inside of the third outer race member 17 (due to the screw-threaded engagement between them). Any suitable arrangement (not shown) may be provided for releasably fastening each outer race member 15 and 16 to the third outer race member 17 after the adjustment has been made. Also, each of the threadedly adjustable outer race members 15 and 16 will have recesses in its outer end face for receiving a spanner wrench. FIG. 2 shows such recesses at 25 on the second outer race member 16.

If desired, the radial annular flange 12 may be provided on the outer race (which then would be of one piece construction). In such modification, the inner race would be of three-piece construction functionally similar to the illustrated three-piece construction of the outer race. Essentially, all that such modification would involve would be a reversal of parts without changing the essential principles of operation.

Also, if desired, the individual arcs of curvature 30, 32, 34 and 36 of the bearing surfaces on the races might be modified so as to conform to the spherical curvature of the ball between the minimum radius points 37 and 35, on one side, and the minimum radius points 33 and 31, on the other. Such modification would not interfere with the desired operation, as described in detail herein.

From the foregoing it will be evident that each of the concave bearing surfaces on the respective races has a minimum radius, measured from the center of the corresponding bearing ball, which is offset radially outward from the axial centerline of the ball. These are the minimum radius points 33 and 37 on the outer arcs 34 and 30 of the bearing surfaces in FIG. 3. Also, each of the concave bearing surfaces on the respective races has a minimum radius, measured from the center of the corresponding bearing ball, which is offset radially inward from the axial centerline of the ball. These are the minimum radius points 31 and 35 on the inner arcs 36 and 32 of the race surfaces in FIG. 3. The four minimum radius points of the concave bearing surfaces for each ball are, of course, equidistant radially from the center of the ball by a dimension equal to the radius of the ball itself.

In the operation of the disclosed embodiment, the bearing takes axial thrust in either direction, and the radial load is divided equally on opposite sides of the shaft 10. This reduces by one-half the charging of the balls against the cage during entry and exit of the load zone. There is much less metal fatigue, which is a principal cause of bearing failure.

The location of the minimum radius points 31, 33, 35 and 37 with respect to the axial centerline of the adjoining ball is a matter of engineering design which will depend on the conditions under which the bearing will be used.

I claim:

1. In a ball bearing having:
    an annular inner race;
    an annular outer race;
    one of said races having an annular, concave bearing surface that faces in one axial direction;
    the other of said races having an annular, concave bearing surface that is spaced axially from and faces toward said bearing surface of said one race;
    and a row of circumferentially arranged, identical, spherical bearing balls engaged axially between said bearing surfaces of the inner and outer races;
    each of said concave bearing surfaces of the inner and outer races projecting both radially inward and radially outward past the axial centerline of each ball;
    the improvement wherein:
        each of said concave bearing surfaces of the inner and outer races has a compound curvature with a first location of minimum radius from the center of each ball which is offset radially outward from the axial centerline of the ball and a second location of minimum radius from the center of each ball which is offset radially inward from the axial centerline of the ball, said minimum radius of the concave bearing surfaces being substantially equal to the radius of each ball, and each of said concave bearing surfaces throughout its annular extent having a larger radius from the center of each ball throughout its extent radially outward from said first minimum radius location thereon and throughout its extent radially inward from said second minimum radius location thereon.

2. A ball bearing according to claim 1, wherein:
    said one race is an inner race having an annular, radially outwardly projecting flange providing said first-mentioned concave bearing surface;
    and said other race is an outer race having an annular, radially inwardly projecting segment providing said second-mentioned concave bearing surface.

3. A ball bearing according to claim 1, and further comprising means for selectively adjusting said races axially with respect to one another to adjust the loading on the balls.

4. A ball bearing according to claim 1, wherein each of said concave bearing surfaces throughout its annular extent between said first and second minimum radius locations thereon has a larger radius from the center of each ball than said minimum radius.

5. A bearing according to claim 1, wherein:
    the concave bearing surface of each race in longitudinal cross-section has a circular curvature, radially outward from the axial centerline of the adjoining ball, whose radius is centered at said second minimum radius location on the opposite concave bearing surface;
    and the concave bearing surface of each race in longitudinal cross-section has a circular curvature, radially inward from the axial centerline of the adjoining ball, whose radius is centered at said first minimum radius location on the opposite concave bearing surface.

6. A ball bearing according to claim 5, wherein:
    said one race is an inner race having an annular, radially outwardly projecting flange providing said first-mentioned concave bearing surface;
    and said other race is an outer race having an annular, radially inwardly projecting segment providing said second-mentioned concave bearing surface.

7. A ball bearing according to claim 6, and further comprising means for selectively adjusting said races axially with respect to one another to adjust the loading on the balls.

8. A ball bearing according to claim 1, and further comprising a cage providing circumferentially spaced pockets which rotatably receive the individual balls, said pockets being open at each axial end to expose the respective balls to the adjacent concave bearing surfaces, said cage extending circumferentially around the outside and the inside of said row of balls between said concave bearing surfaces.

9. A bearing according to claim 1, wherein said first and second minimum radius locations on both concave bearing surfaces are substantially equally offset radially from the axial centerline of the ball.

10. In a double row ball bearing:
    an annular inner race;
    an annular outer race;
    one of said races having an annular, radially projecting segment with oppositely facing, annular, concave bearing surfaces at its opposite axial end faces;
    the other of said races having a pair of axially spaced, annular, radially projecting segments spaced axially on opposite sides of said radially projecting segment of said one race and presenting respective annular, concave bearing surfaces which face respectively toward the bearing surfaces of said one race;

and two axially spaced, circumferentially arranged rows of identical spherical bearing balls engaged axially between the respective confronting bearing surfaces of the outer and inner races;

each of said concave bearing surfaces projecting both radially inward and radially outward past the axial centerline of the adjacent ball;

the improvement wherein:

each of said concave bearing surfaces of the inner and outer races has a compound curvature with a first location of minimum radius from the center of the adjoining ball which is offset radially outward from the axial centerline of the ball and a second location of minimum radius from the center of the adjoining ball which is offset radially inward from the axial centerline of the ball, said minimum radius of the concave bearing surfaces being substantially equal to the radius of each ball, and each of said concave bearing surfaces throughout its annular extent having a larger radius from the center of the ball throughout its extent radially outward from said first minimum radius location thereon and throughout its extent radially inward from said second minimum radius location thereon.

11. A bearing according to claim 10, wherein:

said one race is an inner race having an annular, outwardly projecting flange providing said oppositely facing concave bearing surfaces;

and said other race is an outer race having annular, radially inwardly projecting segments on opposite axial sides of said flange on the inner race which provide the respective concave bearing surfaces facing toward the concave bearing surfaces on said flange.

12. A bearing according to claim 11, wherein said outer race comprises:

a first annular outer race member extending on one axial side of one of said rows of balls;

a second annular outer race member extending on the opposite axial side of the other row of balls;

and a third annular outer race member extending circumferentially around said flange on the inner race and around both said rows of balls and in screw-threaded engagement with said first and second outer race members.

13. A bearing according to claim 12, wherein each of said first and second outer race members is screw-threadedly adjustable along said third outer race member to adjust the loading on the bearing balls or compensate for wear.

14. A bearing according to claim 13, and further comprising a cage for each row of bearing balls providing circumferentially spaced pockets which rotatably receive the individual balls, said pockets being open at each axial end to expose the respective balls to the adjacent concave bearing surfaces, each of said cages extending circumferentially around the respective row of balls between the adjacent concave bearing surfaces.

15. A bearing according to claim 14, wherein each of said bearing surfaces throughout its annular extent between said first and second minimum radius locations thereon has a larger radius from the center of each adjoining ball than said minimum radius.

16. A bearing according to claim 14, wherein:

each bearing surface of each race in longitudinal cross-section has a circular curvature, radially outward from the axial centerline of the adjoining ball, whose radius is centered at said second minimum radius location on the opposite bearing surface;

and each bearing surface of each race in longitudinal cross-section has a circular curvature, radially inward from the axial centerline of the adjoining ball, whose radius is centered at said first minimum radius location on the opposite bearing surface.

17. A bearing according to claim 10, wherein each of said concave bearing surfaces throughout its annular extent between said first and second minimum radius locations thereon has a larger radius from the center of each adjoining ball than said minimum radius.

18. A bearing according to claim 10, wherein:

each concave bearing surface of each race in longitudinal cross-section has a circular curvature, radially outward from the axial centerline of the adjoining ball, whose radius is centered at said second minimum radius location on the opposite concave bearing surface;

and each concave bearing surface of each race in longitudinal cross-section has a circular curvature, radially inward from the axial centerline of the adjoining ball, whose radius is centered at said first minimum radius location on the opposite concave bearing surface.

19. A bearing according to claim 10, and further comprising:

a cage for each row of bearing balls providing circumferentially spaced pockets which rotatably receive the individual balls, said pockets being open at each axial end to expose the respective balls to the adjacent concave bearing surface, each of said cages extending circumferentially around the respective row of balls between the adjacent concave bearing surfaces;

and wherein:

said first and second minimum radius locations on the concave bearing surfaces are substantially equally offset radially from the axial centerline of the adjoining ball.

* * * * *